United States Patent
Corsaro et al.

(10) Patent No.: US 11,518,918 B2
(45) Date of Patent: Dec. 6, 2022

(54) SOLVENT-BASED PRIMER HAVING A LONG OPEN TIME AND IMPROVED ADHESION

(71) Applicant: SIKA TECHNOLOGY AG, Baar (CH)

(72) Inventors: Antonio Corsaro, Regensdorf (CH); Reto Fässler, Zürich (CH)

(73) Assignee: SIKA TECHNOLOGY AG, Baar (CH)

(*) Notice: Subject to any disclaimer, the term of this patent is extended or adjusted under 35 U.S.C. 154(b) by 426 days.

(21) Appl. No.: 16/616,879

(22) PCT Filed: May 22, 2018

(86) PCT No.: PCT/EP2018/063354
§ 371 (c)(1),
(2) Date: Nov. 25, 2019

(87) PCT Pub. No.: WO2018/215445
PCT Pub. Date: Nov. 29, 2018

(65) Prior Publication Data
US 2021/0171700 A1   Jun. 10, 2021

(30) Foreign Application Priority Data
May 23, 2017   (EP) .................................... 17172551

(51) Int. Cl.
| | | |
|---|---|---|
| *C09J 175/04* | (2006.01) | |
| *C08G 18/28* | (2006.01) | |
| *C08G 18/12* | (2006.01) | |
| *C08G 18/22* | (2006.01) | |
| *C08G 18/24* | (2006.01) | |
| *C08G 18/44* | (2006.01) | |
| *C08G 18/75* | (2006.01) | |
| *C09J 175/08* | (2006.01) | |
| *C09D 5/00* | (2006.01) | |
| *C08G 18/42* | (2006.01) | |
| *C08G 18/62* | (2006.01) | |
| *C08K 3/04* | (2006.01) | |
| *C09D 7/20* | (2018.01) | |

(52) U.S. Cl.
CPC ............ *C09J 175/04* (2013.01); *C08G 18/12* (2013.01); *C08G 18/222* (2013.01); *C08G 18/24* (2013.01); *C08G 18/289* (2013.01); *C08G 18/42* (2013.01); *C08G 18/44* (2013.01); *C08G 18/6225* (2013.01); *C08G 18/755* (2013.01); *C08K 3/04* (2013.01); *C09D 5/002* (2013.01); *C09J 175/08* (2013.01); *C09D 7/20* (2018.01)

(58) Field of Classification Search
CPC ... C08G 18/289; C08G 18/44; C08G 18/6225
See application file for complete search history.

(56) References Cited

U.S. PATENT DOCUMENTS

| | | | | |
|---|---|---|---|---|
| 5,109,057 | A * | 4/1992 | Tsuno | C08G 18/8012 524/588 |
| 2010/0105829 | A1 * | 4/2010 | Schmatloch | C09J 175/04 524/588 |
| 2015/0259461 | A1 * | 9/2015 | Laas | C09J 175/06 525/440.03 |
| 2016/0114559 | A1 * | 4/2016 | Mori | C08G 18/758 428/212 |
| 2016/0369036 | A1 * | 12/2016 | Kramer | C08G 18/778 |
| 2017/0029676 | A1 | 2/2017 | Mennecke | |
| 2018/0208813 | A1 * | 7/2018 | Boyer | C08G 18/4018 |

FOREIGN PATENT DOCUMENTS

| | | |
|---|---|---|
| CN | 101595147 A | 12/2009 |
| CN | 102994015 A | 3/2013 |
| CN | 104673170 A | 6/2015 |
| EP | 2 221 331 A1 | 8/2010 |
| EP | 2 805 985 A1 | 11/2014 |
| JP | 2007-051287 A | 3/2007 |
| WO | 01/00632 A2 | 1/2001 |
| WO | 2013/174891 A2 | 11/2013 |
| WO | 2013/174892 A1 | 11/2013 |

OTHER PUBLICATIONS

Abstract for CN 107338017 (Nov. 2017).*
Jun. 29, 2018 International Search Report issued in International Patent Application No. PCT/EP2018/063354.

* cited by examiner

*Primary Examiner* — Marc S Zimmer
(74) *Attorney, Agent, or Firm* — Oliff PLC

(57) ABSTRACT

Adhesion promoter compositions, containing: a) between 40 and 80 parts by weight of a binder composition, including i) 20-40 wt % of at least one silane-terminated polyurethane polymer STP, which can be obtained from at least one polyol P, aliphatic polyisocyanate I and organosilane OS1, ii) 4-20 wt % of at least one organosilane OS2 and/or organotitanate OT, iii) 0-3 wt % of at least one desiccant, iv) 40-80 wt % of solvent L1; b) between 0-30 parts by weight of industrial carbon black; c) between 0-1 parts by weight of UV marker; d) so much of solvent L2 that sum of a)-d) is 100 parts by weight; OS1 having secondary amino, mercapto or hydroxyl group on organic moiety and the at least one STP having been produced in absence of OS2, and the at least one P having an average OH functionality of at least 2 and equivalent weight of at most 500.

14 Claims, No Drawings

SOLVENT-BASED PRIMER HAVING A LONG OPEN TIME AND IMPROVED ADHESION

TECHNICAL FIELD

The invention relates to the field of solvent-based adhesion promoter compositions.

PRIOR ART

Solvent-based adhesion promoter compositions, in particular as primers or adhesion promoter undercoats have long been used to improve the adhesion of adhesives, sealants, coatings and coverings on the substrate. Such adhesion promoter compositions allow good adhesive bonding or coating of substrates without these requiring other further pretreatment, for example mechanical pretreatment or other complex processes. The rapid evaporation of the solvents further allows rapid work and cycle times during adhesive bonding in construction or in industry or short driveaway times in automotive glazing repairs. These adhesion promoter compositions are typically admixed with organosilanes which allow surface modification suitable for adhesive bonding of inorganic materials such as glasses or ceramics and other substrates with adhesives and sealants. However, these otherwise very suitable organosilanes result in problems in adhesion promoter compositions since their high reactivity means that they often undergo condensation with one another after a short time and particularly under warm storage conditions, thus leading to inhomogeneities and precipitation in the adhesion promoter compositions. Attempts have been made to counter this problem by formulating two-component or multicomponent compositions that are mixed only shortly before use. While it was thus possible to increase storage stability by separation of the individual organosilanes, this came at the cost of an additional error-prone step.

In addition, even somewhat more storage-stable one-component compositions or multicomponent compositions having high organosilane contents that are mixed together for use tend to have a very short open time since the silanes hydrolyze and condense very rapidly under the influence of atmospheric humidity. This is undesired especially in the case of relatively time-consuming operations.

Furthermore, conventional solvent-based adhesion promoters are often inadequate in respect of UV stability which has the result that the adhesive bond becomes unstable under prolonged exposure to UV light, thus potentially causing problems in automotive glazing in particular.

SUMMARY OF THE INVENTION

It is accordingly an object of the present invention to provide a one-component, solvent-based adhesion promoter composition which not only comprises exceptional adhesion promoter properties but also has very good storage stability, has a long open time and after use provides high UV stability of the adhesive bond. It was a further object of the present invention to provide an adhesion promoter composition which ensures an adhesive bond that is stable over prolonged periods even under very demanding environmental conditions such as for example under wet, warm and humid or hot conditions.

It has now been found that, surprisingly, an adhesion promoter composition as claimed in claim 1 can achieve these objects.

Further aspects of the invention are the subject of further independent claims. Particularly preferred embodiments of the invention are the subject of the dependent claims.

WAYS OF EXECUTING THE INVENTION

The present invention provides an adhesion promoter composition containing
a) between 40 and 80 parts by weight of a binder composition comprising
   i) 20% to 40% by weight based on the binder composition of at least one silane-terminated polyurethane polymer STP obtainable from at least one polyol P, at least one aliphatic polyisocyanate I and at least one organosilane OS1 preferably in the presence of a catalyst K,
   ii) 4% to 20% by weight based on the binder composition of at least one organosilane OS2 and/or organotitanate OT,
   iii) 0% to 3% by weight based on the binder composition of at least one drying agent,
   iv) 40% to 80% by weight based on the binder composition of a solvent L1;
b) between 0 and 30 parts by weight of carbon black;
c) between 0 and 1 parts by weight of UV marker;
d) sufficient of a solvent L2 for a) to d) to sum to 100 parts by weight;
wherein
the organosilane OS1 comprises a secondary amino group, a mercapto group or a hydroxyl group on the organic radical and preferably comprises two silane groups and
the at least one silane-terminated polyurethane polymer STP was produced in the absence of the organosilane OS2 and
the at least one polyol P has an average OH functionality of at least 2 and an equivalent weight of not more than 500.

In the present document substance names beginning with "poly" such as polyol or polyisocyanate refer to substances formally containing two or more of the eponymous functional groups per molecule.

In the present document the term "polymer" firstly encompasses a collective of macromolecules that are chemically uniform but differ in relation to degree of polymerization, molar mass and chain length, said collective having been produced by a poly reaction (polymerization, polyaddition, polycondensation). The term secondly also encompasses derivatives of such a collective of macromolecules from poly reactions, i.e. compounds which have been obtained by reactions, for example additions or substitutions, of functional groups on defined macromolecules and which may be chemically uniform or chemically nonuniform. The term further encompasses so-called prepolymers, i.e. reactive oligomeric preliminary adducts whose functional groups are involved in the structure of macromolecules.

The term "polyurethane polymer" encompasses all polymers produced according to the so-called diisocyanate polyaddition process. This also includes polymers that are virtually or completely free from urethane groups. Examples of polyurethane polymers are polyether polyurethanes, polyester polyurethanes, polyether polyureas, polyureas, polyester polyureas, polyisocyanurates and polycarbodiimides.

In the present document the term "silane" refers to compounds which on the one hand have at least one, typically two, three or four, alkoxy groups or acyloxy groups bonded directly to the silicon atom via Si—O bonds. The term "organosilane" refers to silanes which additionally comprise at least one, and sometimes two or three, organic radicals bonded directly to the silicon atom via an Si—C bond. Such silanes are also known to the person skilled in the art as organoalkoxysilanes or organoacyloxysilanes. Accordingly, "tetraalkoxysilanes" are not organosilanes according to this definition but belong to the silanes. Accordingly, the term "silane group" refers to the silicon-containing group bonded to the organic radical of the silane via the Si—C bond. The silanes, i.e. the alkoxy- or acyloxysilane groups thereof, have the property of undergoing hydrolysis upon contact with moisture. This forms organosilanols, i.e. organosilicon compounds containing one or more silanol groups (Si—OH groups) and, through subsequent condensation reactions, organosiloxanes, i.e. organosilicon compounds containing one or more siloxane groups (Si—O—Si groups).

The term "silane-functional" refers to compounds comprising silane groups. "Silane-functional polymers" are accordingly polymers comprising at least one silane group.

Silane-containing polymers are in particular silane-containing organic polymers which are typically, and particularly in this document, synonymously also described as "silane-functional polymers", "silane-modified polymers" (SMP) or "silane-terminated polymers" (STP). The crosslinking thereof proceeds via the condensation of silanol groups to form siloxane bonds and is conventionally catalyzed by means of organotin compounds such as dialkyltin (IV) carboxylates in particular.

The term "silane-containing polyether" also encompasses organic silane-containing polymers which, in addition to polyether units, may also contain urethane groups, urea groups or thiourethane groups. Such silane-containing polyethers may also be referred to as "silane-containing polyurethanes".

"Aminosilanes", "hydroxysilanes" and "mercaptosilanes" refer to organosilanes whose organic radical comprises an amino group, hydroxyl group and mercapto group respectively. "Primary aminosilanes" refer to aminosilanes having a primary amino group, i.e. an $NH_2$ group bonded to an organic radical.

"Secondary aminosilanes" refer to aminosilanes having a secondary amino group, i.e. an NH group bonded to two organic radicals.

A substance or composition is referred to as "storage-stable" or "storable" when it can be stored at room temperature in a suitable container over a prolonged period, typically over at least 3 months up to 6 months or more, without any change in its application or service properties to an extent relevant for service thereof, as a result of the storage. To estimate storage stability storage at elevated temperatures may be carried out, thus simulating lengthier storage at lower temperatures such as room temperature.

"Room temperature" refers to a temperature of about 23° C.

All industry standards mentioned in this document relate to the version valid at the date of first filing.

The terms "mass" and "weight" are used synonymously in this document. Thus a "percentage by weight" (% by weight) is a percentage mass fraction which unless otherwise stated relates to the mass (the weight) of the total composition or, depending on the context, of the entire molecule.

"Molecular weight" is understood in the present document to mean the molar mass (in grams per mole) of a molecule or part of a molecule, also referred to as a "radical". "Average molecular weight" denotes the number-average Mn of an oligomeric or polymeric mixture of molecules or radicals which is typically determined by means of gel permeation chromatography (GPC) against a polystyrene standard.

Constituting a first essential constituent of the adhesion promoter composition according to the invention are between 40 and 80 parts by weight of a binder composition comprising i) 20% to 40% by weight based on the binder composition of at least one silane-terminated polyurethane polymer STP obtainable from at least one polyol P, at least one aliphatic polyisocyanate I and at least one organosilane OS1 preferably in the presence of a catalyst K, ii) 4% to 20% by weight based on the binder composition of at least one organosilane OS2 and/or organotitanate OT, iii) 0% to 3% by weight based on the binder composition of at least one drying agent, iv) 40% to 80% by weight based on the binder composition of a solvent L1.

The abovementioned silane-terminated polyurethane polymer STP is a silane-functional polyurethane polymer obtainable by reaction of an organosilane OS1 comprising at least one isocyanate-reactive group with a polyurethane polymer comprising isocyanate groups. This reaction is preferably performed in a stoichiometric ratio of isocyanate-reactive groups to isocyanate groups of 1:1 or with a slight excess of isocyanate-reactive groups so that the resulting silane-functional polyurethane polymer is entirely free from isocyanate groups.

Suitable isocyanate-comprising polyurethane polymers for producing a silane-terminated polyurethane polymer STP are for example polymers obtainable by the reaction of at least one polyol P with at least one polyisocyanate I, in particular a diisocyanate. This reaction may be effected when the polyol P and the polyisocyanate I are reacted with customary processes, for example at temperatures of 50° C. to 100° C., preferably with co-use of suitable catalysts K, wherein the polyisocyanate I has been dosed such that the isocyanate groups thereof are in a stoichiometric excess in relation to the hydroxyl groups of the polyol P.

In particular, the excess of polyisocyanate I is chosen such that in the resulting polyurethane polymer after the reaction of all hydroxyl groups of the polyol a content of free isocyanate groups of 1% to 20% by weight, preferably 5% to 15% by weight, particularly preferably 5.25% to 12% by weight, based on the total polymer, remains.

The polyurethane polymer is preferably produced with co-use of solvent L1, wherein the solvent L1 must not contain isocyanate-reactive groups. Preference is given to polyurethane polymers having the recited content of free isocyanate groups which are obtained from the reaction of polyisocyanate I with polyol P in an NCO:OH ratio (molar ratio of NCO groups of polyisocyanate I to OH groups of polyol P) of 1.5:1 to 2.5:1.

In the reaction of the organosilane OS1 comprising at least one isocyanate-reactive group with a polyurethane polymer comprising isocyanate groups the organosilane OS1 can in principle, albeit not preferably, be employed in substoichiometric amounts to obtain a silane-functional polymer comprising both silane groups and isocyanate groups.

Suitable polyols P for producing the polyurethane polymer and subsequently the silane-terminated polyurethane polymer STP are in particular polyether polyols, poly(m-ethy)acrylate polyols, polyester polyols and polycarbonate polyols and also mixtures of these polyols. However, it is essential to the invention that the at least one employed polyol P has an average OH functionality of at least 2 and an equivalent weight of not more than 500. The OH functionality of a polyol is to be understood here as meaning the average number of OH groups per polyol molecule. The equivalent weight is defined according to formulae (I) and (II)

Equivalent weight=(56.1×1000)/OH number

Equivalent weight=$M_n$/OH functionality wherein the OH number (hydroxyl number) is defined as the amount of potassium hydroxide in milligrams required to neutralize the amount of acetic acid bound upon acetylation of 1 g of polyol and $M_n$ is the average molecular weight (number-average) of the polyol. Both formulae (I) and (II) allow calculation of the equivalent weight. The required values for calculation are obtainable by experiment ($M_n$, OH number) or are published by the manufacturer of the polyols ($M_n$, OH functionality).

Suitable polyether polyols, also known as polyoxyalkylene polyols or oligoetherols, are in particular those which are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as for example water, ammonia or compounds having a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the recited compounds. Employable are both polyoxyalkylene polyols having a low degree of unsaturation (measured according to ASTM D-2849-69 and reported in milliequivalents of unsaturation per gram of polyol (mEq/g)) produced for example using so-called double metal cyanide complex catalysts (DMC catalysts) and polyoxyalkylene polyols having a relatively high degree of unsaturation produced for example using anionic catalysts such as NaOH, KOH, CsOH or alkali metal alkoxides.

Particularly suitable are polyoxyethylene polyols and polyoxypropylene polyols, in particular polyoxyethylene diols, polyoxypropylene diols, polyoxyethylene triols and polyoxypropylene triols.

Also suitable are hydroxyl-terminated polybutadiene polyols, for example those that are produced by polymerization of 1,3-butadiene and allyl alcohol or by oxidation of polybutadiene and also hydrogenation products thereof.

Also suitable are styrene-acrylonitrile-grafted polyether polyols such as are commercially available for example under the trade name Lupranol® from Elastogran GmbH, Germany.

Suitable polyester polyols include in particular polyesters which bear at least two hydroxyl groups and are produced by known processes, in particular polycondensation of hydroxycarboxylic acids or polycondensation of aliphatic and/or aromatic polycarboxylic acids with dihydric or polyhydric alcohols. Especially suitable are polyester polyols produced from divalent to trivalent alcohols such as for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or the anhydrides or esters thereof such as for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the aforementioned acids and polyester polyols formed from lactones such as for example ε-caprolactone.

Particularly suitable are polyester diols and triols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as for example ε-caprolactone and from ethylene glycol, diethylene glycol, neopentyl glycol, 1,4-butanediol, glycerol, 1,6-hexanediol, dimer fatty acid diol and 1,4-cyclohexanedimethanol as the divalent and/or trivalent alcohol.

Examples of suitable polyester polyols are Capa® polyols from Perstorp, in particular Capa® 3031 and Capa® 4101, and also Baycoll® polyols from Covestro, in particular Baycoll® 670. However, care must be taken to ensure that the polyester polyols meet the abovementioned conditions in respect of OH functionality and equivalent weight which is not necessarily the case for the entire product range of the recited manufacturers.

Suitable polycarbonate polyols include in particular those obtainable by reaction for example of the abovementioned alcohols used to construct the polyester polyols with dialkyl carbonates such as dimethyl carbonate, diaryl carbonates such as diphenyl carbonate or phosgene. Likewise suitable are polycarbonates obtainable from the copolymerization of $CO_2$ with epoxides such as ethylene oxide and propylene oxide. Polycarbonate diols, in particular amorphous polycarbonate diols, are particularly suitable.

Suitable polycarbonate polyols include for example Kuraray® polyols from Kuraray, in particular Kuraray® C590, and Desmophen® polyols from Covestro, in particular Desmophen® C1100. However, care must be taken to ensure that the polycarbonate polyols meet the abovementioned conditions in respect of OH functionality and equivalent weight which is not necessarily the case for the entire product range of the recited manufacturers.

Further suitable polyols are poly(meth)acrylate polyols.

Also suitable are polyhydroxy-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols, respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable degradation products of natural fats and oils are especially fatty acids and fatty alcohols and also fatty acid esters, especially the methyl esters (FAME), which can be derivatized to hydroxy fatty acid esters by hydroformylation and hydrogenation for example.

Likewise suitable in addition are polyhydrocarbon polyols, also known as oligohydrocarbonols, for example polyhydroxy-functional ethylene-propylene, ethylene-butylene or ethylene-propylene-diene copolymers, such as are produced for example by Kraton Polymers, USA, or polyhydroxy-functional copolymers of dienes such as 1,3-butanediene or diene mixtures and vinyl monomers such as styrene, acrylonitrile or isobutylene, or polyhydroxyfunctional polybutadiene polyols, for example those that are produced by copolymerization of 1,3-butadiene and allyl alcohol and may also be hydrogenated.

Also suitable are polyhydroxy-functional acrylonitrile/butadiene copolymers, such as may be produced for example from epoxides or amino alcohols and carboxyl-terminated acrylonitrile/butadiene copolymers which are available commercially under the name Hypro® (formerly Hycar®) CTBN from Emerald Performance Materials, LLC, USA.

All recited polyols preferably have an average molecular weight of 200 to 5000 g/mol, in particular from 250 to 2500 g/mol, preferably from 300 to 2000 g/mol, and preferably an average OH functionality in the range from 2 to 4.

Particularly suitable polyols are polyester polyols, polycarbonate polyols and poly(meth)acrylate polyols. These polyols allow a particularly good adhesion promotion action.

Also co-usable in the production of the terminal isocyanate-comprising polyurethane polymer, in addition to these polyols mentioned, are small amounts of low molecular weight dihydric or polyhydric alcohols such as for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular mass alkoxylation products of the aforementioned dihydric and polyhydric alcohols and mixtures of the aforementioned alcohols.

Employable polyisocyanates I for the production of the polyurethane polymer include commercially available aliphatic polyisocyanates, in particular diisocyanates. Aromatic polyisocyanates are not suitable since compared to aliphatic polyisocyanates they provide an insufficient UV stability of the composition after use.

Suitable diisocyanates include for example 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, oligomers and polymers of the recited isocyanates and any desired mixtures of the recited isocyanates.

1-Isocyanato-3,3,5-trimethyl-5-isocyanatomethylcyclohexane (=isophorone diisocyanate or IPDI) is most preferred.

The organosilane OS1 comprising at least one isocyanate-reactive group is for example a hydroxysilane, a mercaptosilane or an aminosilane, in particular a hydroxysilane or an aminosilane.

In a first preferred embodiment the organosilane OS1 is an aminosilane. It is preferable when the aminosilane is an aminosilane AS of formula (III),

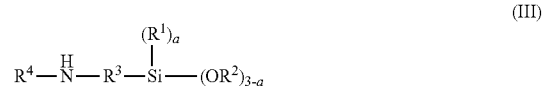

The radical $R^1$ represents an alkyl group having 1 to 8 carbon atoms, in particular a methyl group or an ethyl group.

The radical $R^2$ represents an alkyl group having 1 to 12 carbon atoms, in particular an alkyl group having 2 to 8 carbon atoms, preferably a methyl, ethyl or isopropyl group, most preferably a methyl or ethyl group.

The radical $R^3$ represents a linear or branched, optionally cyclic, alkylene group having 1 to 12 carbon atoms, optionally having aromatic proportions, and optionally having one or more heteroatoms, in particular having one or more nitrogen and/or oxygen atoms. The index a has a value of 0 or 1 or 2, in particular a value of 0.

It is most preferable when the radical $R^2$ is a methyl or ethyl group, i.e. in the composition according to the invention as described hereinabove the alkoxy end groups of the silane-functional polymer P are methoxy or ethoxy groups.

The advantage of silane-functional polymers comprising ethoxy groups as alkoxy end groups is that the crosslinking with water liberates ethanol, thus ensuring that the compositions are ecologically and toxicologically unconcerning.

The advantage of silane-functional polymers comprising methoxy groups as alkoxy end groups is that they are particularly reactive in the crosslinking with water and toxicologically concerning crosslinking catalysts such as for example tin catalysts can be eschewed.

Within one silane group of formula (III) $R^1$ and $R^2$ each independently of one another represent the described radicals. Thus also possible for example are compounds of formula (III) which represent diethoxymethoxysilanes ($R^2$=ethyl, $R^2$=ethyl, $R^2$=methyl).

$R^4$ represents a linear or branched, monovalent hydrocarbon radical having 1 to 20 carbon atoms which optionally comprises cyclic proportions or represents a radical of formula (IV).

The radicals $R^5$ and $R^6$ each independently of one another represent a hydrogen atom or a radical from the group consisting of —$R^8$, —$COOR^8$ and —CN.

The radical $R^7$ represents a hydrogen atom or a radical from the group consisting of —$CH_2$—$COOR^8$, —$COOR^8$, —$CONHR^8$, —$CON(R^8)_2$, —CN, —$NO_2$, —$PO(OR^8)_2$, —$SO_2R^8$ and —$SO_2OR^8$.

The radical $R^8$ represents a hydrocarbon radical having 1 to 20 carbon atoms and optionally comprising at least one heteroatom.

Examples of suitable aminosilanes AS are secondary aminosilanes such as N-butyl-3-aminopropyltrimethoxysilane, N-butyl-3-aminopropyltriethoxysilane, N-phenyl-3-aminopropyltrimethoxysilane and N-phenyl-3-aminopropyltriethoxysilane; the products of the Michael-like addition of primary aminosilanes such as 3-aminopropyltrimethoxysilane or 3-aminopropyldiethoxymethylsilane onto Michael acceptors such as acrylonitrile, (meth)acrylic esters, (meth)acrylamides, maleic and fumaric diesters, citraconic diesters and itaconic diesters, for example dimethyl and diethyl N-(3-trimethoxysilylpropyl)aminosuccinates as well as analogs of the recited aminosilanes comprising isopropoxy, n-propoxy and corresponding butoxy, pentoxy hexoxy, heptoxy and octoxy groups instead of the methoxy or ethoxy groups on the silicon. Particularly suitable aminosilanes AS include secondary aminosilanes, in particular aminosilanes AS of formula (III). Preference is given to the Michael-like adducts, in particular diethyl N-(3-trimethoxysilylpropyl)aminosuccinate and diethyl N-(3-triethoxysilylpropyl)aminosuccinate.

In the present document the term "Michael acceptor" refers to compounds which on account of their double bonds activated by electron acceptor radicals are capable of undergoing nucleophilic addition reactions with primary amino groups ($NH_2$ groups) in a manner analogous to the Michael addition (hetero Michael addition).

Suitable aminosilanes further include in particular those obtainable from the reaction of an N-aminoethylaminoalkyltrialkoxysilane with a maleic or fumaric diester. Such suitable aminosilanes are described for example in WO 01/00632. Silane-terminated polyurethane polymers produced with corresponding aminosilanes are for example described in European patent application number EP09153120.2.

Suitable hydroxysilanes for the production of polymers STP include for example those described in EP2805985 (especially page 2, line 51 to page 3, line 28) and WO 2013/174891 (especially page 6, line 11 to page 8, line 5) and WO 2013/174892 (especially page 6, line 6 to page 7, line 6) whose recited disclosure is hereby incorporated by reference.

Suitable mercaptosilanes for producing polymers STP include for example 3-mercaptopropyltrimethoxysilanes, 3-mercaptopropylmethyldimethoxysilanes, 3-mercaptopropyltriethoxysilanes and 3-mercaptopropylmethyldiethoxysilanes.

The organosilane OS1 is preferably an aminosilane AS of formula (III) or an aminosilane of formula (V).

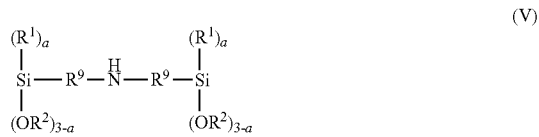
(V)

The radicals $R^1$ and $R^2$ and the index a are as defined hereinabove.

$R^9$ independently at each occurrence represents a divalent, linear or branched, optionally cyclic alkylene group having 1 to 20 carbon atoms, optionally having aromatic portions, and optionally having one or more heteroatoms, especially nitrogen atoms.

A particularly preferred organosilane OS1 is an aminosilane of formula (V).

Examples of suitable organosilanes of formula (V) are for example the organosilanes selected from the group comprising bis[3-(trimethoxysilyl)-propyl]amine and bis[3-(triethoxysilyl)propyl]amine.

Production of the silane-terminated polyurethane polymer STP is preferably carried out in the presence of a catalyst K capable of catalyzing the reaction of the polyisocyanate I with the polyol P. This is preferably a metal catalyst, in particular a tin or zirconium catalyst.

Suitable metal catalysts which are very well known to the person skilled in the art of polyurethane chemistry are for example compounds of titanium, zirconium or tin, in particular organotin compounds, organotitanates or organozirconates, wherein these metal catalysts especially comprise ligands having alkoxy groups, sulfonate groups, carboxyl groups, dialkyl phosphate groups, dialkyl pyrophosphate groups and diketonate groups.

Tin and zirconium catalysts are particularly preferred. Compared to other catalysts, for example titanates, these have the advantage that no possibly undesired discolorations occur in the composition.

The catalyst K which typically remains in the polymer STP and thus in the composition after the reaction can generally also assume the role of a hydrolysis or crosslinking catalyst for silanes and silane-functional polymers. This may be advantageous during and after use of the adhesion promoter composition since a substantial acceleration or improvement in adhesion promoter effectiveness may be achieved.

The adhesion promoter composition according to the invention preferably further comprises at least one catalyst for crosslinking silane-functional polymers. In addition to the abovementioned metal catalysts K which can assume this role, all customary hydrolysis and condensation catalysts for organosilanes and silane-functional polymers which are well known to the person skilled in the art of organosilanes chemistry are suitable.

The catalyst is in particular a metal catalyst or a nitrogen-containing compound.

Nitrogen-containing compounds suitable as the catalyst are in particular amines such as in particular N-ethyldiisopropylamine, N,N,N',N'-tetramethylalkylenediamines, polyoxyalkyleneamines, 1,4-diazabicyclo[2.2.2]octane; aminosilanes such as in particular 3-aminopropyltrimethoxysilane, 3-aminopropyldimethoxylmethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine and analogs thereof with ethoxy or isopropoxy groups instead of methoxy groups on the silicon; amidines such as in particular 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as in particular tetramethylguanidine, 2-guanidinobenzimidazole, acetylacetoneguanidine, 1,3-di-o-tolylguanidine, 2-tert-butyl-1,1,3,3-tetramethylguanidine; and imidazoles such as in particular N-(3-trimethoxysilylpropyl)-4,5-dihydroimidazole and N-(3-triethoxysilylpropyl)-4,5-dihydroimidazole.

Also especially suitable are combinations of different catalysts, in particular combinations of at least one metal catalyst and at least one nitrogen-containing compound.

The binder composition present in the adhesion promoter composition according to the invention further comprises at least one further organosilane OS2 and/or an organotitanate OT. In many suitable forms the organosilane OS2 comprises organic reactive groups that can react with isocyanates. It is therefore important that the silane-terminated polyurethane polymer STP is produced in the absence of an organosilane OS2. This may be achieved for example by initially producing the silane-terminated polyurethane polymer STP completely, i.e. by reaction of virtually all isocyanate groups, and only subsequently adding the organosilane OS2. Alternatively, the silane-terminated polyurethane polymer STP may be produced in another vessel in advance and only subsequently be formulated with the organosilane OS2 and further constituents to afford the adhesion promoter composition according to the invention.

Suitable organosilanes OS2 include all organosilanes suitable as organosilane OS1 and described hereinabove. Also suitable are for example the organosilicon compounds selected from the group comprising octyltrimethoxysilane, dodecyltrimethoxysilane, hexadecyltrimethoxysilane, methyloctyldimethoxysilane; 3-glycidyloxypropyltrimethoxysilane, 3-glycidyloxypropyltriethoxysilane; 3-methacryloyloxypropyltrialkoxysilanes, 3-methacryloyloxypropyltriethoxysilane, 3-methacryloyloxypropyltrimethoxysilane; 3-aminopropyltrimethoxysilane, 3-aminopropyltriethoxysilane, 3-aminopropyldimethoxymethylsilane, 3-amino-2-methylpropyltrimethoxysilane, N-(2-aminoethyl)-3-aminopropyltrimethoxysilane, N-(2-aminoethyl)-3-aminopropyltriethoxysilane, N-(2-aminoethyl)-3-aminopropyldimethoxymethylsilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, [3-(2-aminoethylamino)propyl]trimethoxysilane (=4,7,10-triazadecyltrimethoxysilane), 2-aminoethyltrimethoxysilane, 2-aminoethyldimethoxymethylsilane, aminomethyltrimethoxysilane, aminomethyldimethoxymethylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane; 3-mercaptopropyltriethoxysilane, 3-mercaptopropyltrimethoxysilane, 3-mercaptopropylmethyldimethoxysilane; 3-acylthiopropyltrimethoxysilane; vinyltrimethoxysilane and vinyltriethoxysilane; bis(3-trimethoxysilylpropyl)tetrasulfane, bis(3-methyldimethoxysilyl-propyl)tetrasulfane, bis(3-triethoxylsilylpropyl)tetrasulfane, bis(3-methyldiethoxysilylpropyl)tetrasulfane, bis(3-trimethoxysilylpropyl) disulfide, bis(3-methyldimethoxysilylpropyl) disulfide, bis(3-triethoxylsilylpropyl) disulfide and bis(3-methyldiethoxysilylpropyl)disulfides; isocyanuratosilane compounds such as 1,3,5-N-tris(3-trimethoxysilylpropyl)isocyanuratosilane, 1,3,5-N-tris(3-methyldimethoxysilylpropyl)isocyanuratosilane, 1,3,5-N-tris(3-triethoxysilylpropyl)isocyanuratosilane, 1,3,5-N-tris(3-methyldiethoxysilylpropyl)isocyanuratosilane;

Also suitable are the recited organosilicon compounds whose alkoxy groups have been replaced by acetoxy groups, for example octyltriacetoxysilane (octyl-Si(O(O=C)CH$_3$)$_3$). Such organosilicon compounds eliminate acetic acid upon hydrolysis.

Likewise suitable are partial hydrolyzates, hydrolyzates and condensates of these recited silanes which are also commercially available as oligomeric organosiloxanes.

Also suitable are hydroxysilanes, for example those described hereinabove as organosilane OS1.

Suitable organosilanes OS2 further include the organosilicon compounds selected from the group comprising bis[3-(trimethoxysilyl)propyl]amine, bis[3-(triethoxysilyl)propyl]amine, 4,4,15,15-tetraethoxy-3,16-dioxa-8,9,10,11-tetrathia-4-15-disilaoctadecane (bis(triethoxysilylpropyl) polysulfide or bis(triethoxysilylpropyl)tetrasulfane), bis(triethoxysilylpropyl) disulfide.

Suitable organosilanes OS2 further include the organosilicon compounds selected from the group comprising tris[3-(trimethoxysilyl)propyl]amine, tris[3-(triethoxysilyl) propyl]amine, 1,3,5-tris[3-(trimethoxysilyl)propyl]-1,3,5-triazine-2,4,6(1H,3H,5H)-trioneurea (=tris(3-(trimethoxysilyl)propyl) isocyanurate) and 1,3,5-tris[3-(triethoxysilyl)propyl]-1,3,5-triazine-2,4,6(1H,3H,5H)-trioneurea (=tris(3-(triethoxysilyl)propyl) isocyanurate).

Preferred organosilanes OS2 are aminosilanes. Particular preference is given to 3-aminopropyltrimethoxysilane, N-(2-aminoethyl)-3-aminopropyltrimethoxysilane, bis[3-(trimethoxysilyl)propyl]amine, 3-aminopropyltriethoxysilane, N-(2-aminoethyl)-3-aminopropyltriethoxysilane and bis[3-(triethoxysilyl)propyl]amine and mixtures thereof with one another.

The adhesion promoter composition according to the invention further contains alternatively or in addition to the organosilane OS2 at least one organotitanate OT. The composition according to the invention may contain only organotitanate OT, only organosilane OS2 or a mixture of both.

Particular preference is given to compositions which comprise as organosilane OS2 and/or organotitanate OT at least one, preferably at least two, compounds selected from the group comprising aminosilanes, hydroxysilanes, epoxysilanes, mercaptosilanes, isocyanuratosilanes, reaction products of amines and epoxysilanes, reaction products of aminosilanes and epoxides, reaction products of aminosilanes and epoxysilanes, reaction products of isocyanates and aminosilanes, reaction products of isocyanates and hydroxysilanes, tetraalkoxytitanates, dialkoxybisacetylacetonatotitanates and mixtures, hydrolyzates, partial hydrolyzates and/or condensates of these compounds.

The at least one organotitanate OT comprises at least one substituent bonded to the titanium atom via an oxygen-titanium bond.

Particularly suitable compounds are those in which all substituents bonded to the titanium are selected from the group consisting of alkoxy group, sulfonate group, carboxylate group, dialkylphosphate group, dialkylpyrophosphate group and acetylacetonate group, wherein all substituents may be identical or different.

Carboxylate groups which have proven particularly suitable are in particular carboxylates of fatty acids. A preferred carboxylate is decanoate.

Organotitanium compounds suitable as the organotitanate OT are commercially available for example from Kenrich Petrochemicals or DuPont. Examples of suitable organotitanium compounds are for example Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA 01, LICA 09, LICA 12, LICA 38, LICA 44, LICA 97, LICA 99, KR OPPR, KR OPP2 from Kenrich Petrochemicals or Tyzor® ET, IBAY, TBT, TOT TPT, NPT, BTM, AA, AA-75, AA-95, AA-105, TE, ETAM, OGT from DuPont or Dorf Ketal. Preference is given to Ken-React® KR 7, KR 9S, KR 12, KR 26S, KR 38S, KR44, LICA 09, LICA 44, NZ 44 and Tyzor® ET, IBAY, TBT, TOT, TPT, NPT, BTM, AA, AA-75, AA-95, AA-105, TE, ETAM, OGT from DuPont/Dorf Ketal. Particularly preferred are Tyzor® TBT, Tyzor® OGT and, particularly preferably, Tyzor® IBAY.

It is apparent to the person skilled in the art that these organotitanium compounds undergo hydrolysis under the influence of water and form OH groups bonded to the Ti atom. Such hydrolyzed or partially hydrolyzed organotitanium compounds may themselves undergo condensation to form condensation products comprising Ti—O—Ti bonds. If silanes and/or titanates are mixed in the adhesion promoter mixed condensation products comprising Si—O—Ti bonds are also possible. A small proportion of such condensation products is possible, in particular when they are soluble, emulsifiable or dispersible.

The composition according to the invention contains 1.6% to 16% by weight, preferably 2% to 10% by weight, based on the total adhesion promoter composition, of at least one organosilane OS2 and/or organotitanate OT.

The binder composition present in the adhesion promoter composition according to the invention further comprises at least one solvent L1. The total adhesion promoter composition further contains at least one solvent L2. These solvents L1 and L2 may be identical or different.

Suitable solvents L1 include all solvents capable of sufficiently dissolving or at least dispersing the constituents of the binder composition for a stable solution or dispersion to be formed. Furthermore, the solvents L1 shall not contain any functional groups reactive with isocyanates or alkoxysilanes such as hydroxyl groups. Alcohols are thus not suitable for example.

It is advantageous when the solvents L1 and L2 have a comparatively high volatility, i.e. a comparatively low boiling point and/or vapor pressure, in order that a rapid evaporation or volatilization of the solvent L1 takes place after use of the adhesion promoter according to the invention. However, it is also possible for low-volatility or high-boiling solvents to be used, though these then need to be removed with a "wipe-off" method (wiping or aspirating the solvent after curing of the binder on the substrate).

It is generally preferable not to use solvents L1 and/or L2 that are toxicologically very concerning or very highly flammable. In these cases the user must ensure that Occupational Health & Safety is adequately safeguarded, for example through adequate ventilation, personal protective equipment or equipment for avoiding static discharge.

Suitable solvents L1 and L2 are for example esters of linear or branched $C_1$ to $C_6$ carboxylic acids, in particular mono- or diacids esterified with fatty alcohols or linear or branched $C_1$ to $C_6$ monoalcohols and also esters of low molecular weight alcohols, in particular $C_1$- to $C_6$-alcohols esterified with fatty acids and cyclic forms of such esters. Examples thereof are methyl laurate, ethyl laurate, methyl myristate and lauryl acetate.

Especially suitable esters likewise include esters of carbonic acid or monocarboxylic acids or polycarboxylic acids. Suitable esters of carbonic acid include in particular dialkyl carbonates.

Likewise suitable are esters of carboxylic acids with polyethylene glycols or polypropylene glycols.

Likewise suitable esters are organic phosphonates and phosphates.

Also suitable are cyclic esters, i.e. lactones.

Suitable solvents L1 and L2 likewise include linear or branched ether compounds having one or two ether functions that bridge $C_2$ to $C_{12}$ alkyl radicals.

Suitable ethers also include in particular alkoxy-terminated polyols, in particular alkoxy-terminated polyoxyalkylene polyols and also alkoxy-terminated polyether polyols. Examples thereof are polypropylene glycol dialkyl ethers or polyethylene glycol dialkyl ethers. Examples thereof are tetraglyme (tetraethylene glycol dimethyl ether), pentaglyme (pentaethylene glycol dimethyl ether), hexaglyme (hexaethylene glycol dimethyl ether), polyethylene glycol dimethyl ether, such as are commercially available for example from Clariant under the name Polyglykol DME 200 or Polyglykol DME 250, diethylene glycol dibutyl ether, polypropylene glycol dimethyl ether, polypropylene glycol dibutyl ether, polyethylene glycol monomethyl ether monoacetate and polypropylene glycol monomethyl ether monoacetate. Compared to the corresponding polyethylene glycol diethers, polypropylene glycol diethers have the advantage that they typically have better dissolution characteristics and are still liquid at higher molecular weights.

Suitable solvents L1 and L2 additionally include ketones having linear or branched $C_1$ to $C_{12}$ alkyl radicals and amides, in particular fatty acid amides or cyclic amides, i.e. lactams.

The adhesion promoter composition may also comprise as solvent L1 and/or L2 a carrier medium liquid at room temperature having a boiling point of greater than 250° C. at standard pressure or a vapor pressure of less than 0.1 mbar at 20° C. This type of solvent has the advantage that low-VOC or VOC-free compositions may be formulated. "VOC" stands for volatile organic compounds.

Suitable carrier media for low-VOC or VOC-free compositions include plasticizers having a boiling point of greater than 250° C. at standard pressure or a vapor pressure of less than 0.1 mbar at 20° C.

The plasticizers are in particular selected from the group consisting of esters of phthalic acids, esters of aliphatic dicarboxylic acid and fatty acid esters and organic esters of phosphoric acids. Suitable esters of phthalic acids include in particular dialkyl phthalates, preferably the diesters of phthalic acid and $C_8$-$C_{16}$-alcohols, in particular dioctyl phthalate (DOP), diisononyl phthalate (DINP) and diisodecyl phthalate (DIDP).

Esters of aliphatic dicarboxylic acids are in particular the esters of adipic acid or sebacic acid, for example dioctyl adipate (DOA), diisodecyl adipate (DIDA). It is also possible to employ polyesters such as for example polyesters of adipic acid or sebacic acid with diols such as for example hexanediol or butanediol with the proviso that these polyesters are liquid at room temperature.

However, the proviso that applies for all of these compounds employed as solvents L1 and/or L2 is that they must be liquid (flowable) at 23° C., preferably at 10° C., in particular at 5° C.

Preferred solvents L1 and/or L2 are methyl acetate, ethyl acetate, butyl acetate, isopropyl acetate, 1-methoxy-2-propyl acetate, 3-methoxy-n-butyl acetate, acetone, methyl ethyl ketone, methyl isobutyl ketone, toluene, ethylbenzene and mixtures thereof. 3-Methoxy-n-butyl acetate, methyl ethyl ketone and butyl acetate are most preferred.

The amount of solvent L1 in the binder composition is between 40% and 80% by weight, preferably between 50% and 70% by weight, based on the binder composition.

It may well be advantageous, in particular if the adhesion promoters are insoluble or insufficiently soluble in the solvent L1 and/or L2, for surfactants, in particular in the form of emulsifiers and/or co-emulsifiers, to be constituents of the adhesion promoter compositions. Such substances are known to a person skilled in the art of solvent-based adhesion promoter compositions.

The binder composition preferably further contains at least one drying agent. This increases the storage stability of the composition by binding any water present and thus inhibiting the undesired hydrolysis of alkoxysilanes in the container.

Suitable drying agents include for example reactive silanes such as tetramethoxysilane, vinyltrimethoxysilane, α-functional silanes such as N-(silylmethyl)-O-methyl carbamates, in particular N-(methyldiethoxysilylmethyl)-O-methyl carbamate, (methacryloxymethyl)silanes, ethoxymethylsilanes, N-phenyl-, N-cyclohexyl- and N-alkylsilanes, orthoformate esters, calcium oxide or molecular sieves and also isocyanates.

The amount of drying agent in the binder composition is between 0% and 3% by weight, preferably between 0.5% and 2% by weight, based on the binder composition.

It may further be advantageous for the adhesion promoter composition to contain a filler. The filler may be inorganic or organic. It is particularly advantageous when the filler comprises a particle diameter of less than 100 micrometers, in particular of less than 1 micrometer. Particular preference is given to carbon blacks, chalk, in particular coated chalks, different types of silicon dioxide, such as quartz flour, colloidal or pyrogenic silicas, preferably pyrogenic silicas. Carbon black is the most preferred filler. This filler results in a particularly good UV resistance of the adhesive bond which is advantageous for example for adhesive bonding of windows and automotive glazing. The preferred amounts of filler, in particular carbon black, are 0% to 30% by weight, in particular 5% to 20% by weight, preferably 7% to 15% by weight, based on the total adhesion promoter composition.

The use of fillers is moreover especially suitable for mechanical reinforcement of the adhesion promoter composition. The use of fillers further makes it possible to realize relatively thick-film applications.

If the adhesion promoter composition is a primer it may be advantageous to additionally employ at least one organic film former. This may be for example an epoxy resin or poly(meth)acrylate.

The composition may additionally also comprise further constituents. These include in particular pigments, dyes, UV markers, fluorescence indicators, flow additives, biocides, in particular algicides or fungicides, thixotropic agents, flame retardants and stabilizers.

It is especially preferable when the adhesion promoter composition according to the invention contains a UV marker. This is a substance which becomes visible under UV light. The use of such a substance has the advantage that after application of transparent adhesion promoter compositions it makes it possible to check where precisely the composition has been applied and/or where the adhesive is to be applied.

The adhesion promoter compositions according to the invention may be used in various ways. In a particularly preferred embodiment, they are a primer or an adhesion-promoting undercoat.

In a further aspect the present invention relates to a method of adhesive bonding or of sealing. This method comprises the following steps:
 i) applying an adhesion promoter composition as described hereinabove to a substrate S1 to be adhesively bonded or sealed
 ii) applying an adhesive or sealant to the composition present on the substrate S1
 iii) contacting the adhesive or sealant with a second substrate S2; or
 i') applying an adhesion promoter composition as described hereinabove to a substrate S1 to be adhesively bonded or sealed
 ii') applying an adhesive or sealant to the surface of a second substrate S2
 iii') contacting the adhesive or sealant with the composition present on the substrate S1;
 or
 i") applying an adhesion promoter composition as described hereinabove to a substrate S1 to be adhesively bonded or sealed
 ii") applying an adhesive or sealant between the surfaces of substrates S1 and S2.

The second substrate S2 is here made of a material which is identical or different to that of the substrate S1.

Typically, step iii), iii') or ii") is followed by a step iv) of curing the adhesive or sealant.

The adhesive or sealant used may in principle be any adhesive or sealant. The selection is guided by factors including the open time and the mechanical demands on the bond formed. It has been found that this method is especially suitable for polyurethane adhesives or sealants, in particular for polyurethane adhesives containing at least one isocyanate-comprising polyurethane prepolymer. Such polyurethane adhesives cure under the influence of atmospheric humidity via a crosslinking reaction of the isocyanate groups and are commercially widely available, especially under the name Sikaflex® from Sika Schweiz AG. The adhesion promoter composition is likewise particularly suitable for silane-terminated (silane-functional) adhesives and sealants. Step ii), ii') or ii") may optionally be preceded by a step of wiping with a dry cloth (often referred to as "wipe off" in the art).

Application of the adhesive or sealant may be deferred until the adhesion promoter composition has flashed off. However, it has been found that, surprisingly, the adhesive or sealant may in most cases be applied directly to the still-moist adhesion promoter composition film, i.e. "wet-on-wet", without this resulting in any noticeable disadvantages in terms of the adhesion or mechanical properties of the cured sealant or adhesive.

The substrate S1 may be identical or different to substrate S2.

Suitable substrates S1 or S2 are for example inorganic substrates such as glass, glass ceramic, concrete, mortar, brick, tile, gypsum and natural stones such as granite or marble; metals or alloys such as aluminum, steel, nonferrous metals, galvanized metals; organic substrates such as wood, plastics such as PVC, polycarbonates, PMMA, polyesters, epoxy resins; coated substrates such as powder-coated metals or alloys; and paints and lacquers. Especially preferred substrates S1 or S2 are glass, glass ceramic, aluminum and lacquers, especially in the form of automotive lacquer.

If required the substrates may be pretreated before application of the adhesive or sealant. Such pretreatments comprise in particular physical and/or chemical cleaning processes, for example sanding, sandblasting, brushing or the like or treating with cleaners or solvents.

Such a method of adhesive bonding or of sealing results in an article. Since the method may be widely employed, for example in industrial manufacturing or in civil engineering or structural engineering, this article may also vary very widely in nature.

Said article is in particular an article which is a built structure, an industrial good or a means of transport. It is in particular a building, or a part thereof. In particular, the article is alternatively a means of transport, especially an automobile, bus, truck, rail vehicle, ship or aircraft.

EXAMPLES

The following adhesion promoter compositions were produced according to table 1 by adding the adhesion promoter to the carrier medium and stirring well under nitrogen.

The following substances and designations were used:
Employed Polyols P for Production of Polymer STP

TABLE 1

Employed polyols P.

| Name | Category | OH number | Functionality | Equivalent weight |
|---|---|---|---|---|
| Kuraray C590 | Polycarbonate polyol | 229 | 2 | 245 |
| Desmophen C1100 | Polycarbonate polyol | 115 | 2 | 488 |
| Desmophen C1200 | Polycarbonate polyol | 56 | 2 | 1002 |
| Oxymer M112 | Polycarbonate polyol | 112 | 2 | 501 |
| Capa 3031 | Polyester polyol | 560 | 3 | 100 |
| Capa 4101 | Polyester polyol | 218 | 4 | 257 |
| Dynacoll 7131 | Polyester polyol | 35 | 2 | 1603 |
| Baycoll 670 | Polyester polyol | 141 | 3.2 | 398 |
| Baycoll AV 2113 | Polyester polyol | 109 | 3.2 | 515 |
| Baycoll AS 2060 | Polyester polyol | 60 | 2.7 | 935 |

The polyols in table 1 were used as polyol P for producing the exemplary silane-terminated polyurethane polymers STP.

Further Raw Materials Employed

The raw materials of table 2 were also used for production of the exemplary compositions.

TABLE 2

Further raw materials employed.

| Name | Function | Chemical name | Manufacturer |
|---|---|---|---|
| Silquest A1170 | Organosilane | Bis(trimethoxysilylpropyl)amine | Momentive |
| Silquest A189 | OS2 | 3-Mercaptopropyltrimethoxysilane | Momentive |
| Silquest A-Link 597 | | Tris(3-trimethoxysilylpropyl) isocyanurate | Momentive |
| Tyzor IBAY | Organo-titanate OT | Di-2-butyl bis-acetylacetonatotitanate | Dorf Ketal |
| Al(2-OBu)$_3$ | — | Aluminum tri-sec-butoxide | Sigma Aldrich |
| MEK | Solvent L2 | Methyl ethyl ketone | Sigma Aldrich |
| IPDI | Isocyanate I | Isophorone diisocyanate | Evonik |
| Butoxyl | Solvent L1 | 3-Methoxy-n-butyl acetate | Celanese |
| TIB 223 | Catalyst K | Dioctyltin diketanoate | TIB Chemicals |

Production of the Silane-Terminated Polyurethane Polymers STP

For each silane-terminated polyurethane polymer STP a solution of the polyol from table 1 (50% by weight in butoxyl) was mixed with a solution of IPDI (50% by weight in butoxyl) and stirred well. 0.1% by weight of TIB 223 (catalyst K) was then added and stirred until commencement of the exothermic reaction. The reaction mixture was then allowed to react for a further 24 h at 50° C. After cooling to room temperature after termination of the reaction the mixture was admixed with a calculated amount of the silane endcapper (organosilane OS1) Silquest A1170, the amount of which corresponded precisely to the amount of free NCO groups in the polyurethane polymer formed. Details of these silane-terminated polyurethane polymers STP produced are reported in table 3. The column "NCO:OH" specifies the employed molar ratio of NCO groups to OH groups before the reaction with Silquest A1170 and the column "% by wt. NCO" specifies the proportion of free NCO groups after the reaction of polyol and IPDI but before the reaction with Silquest A1170. The amount of Silquest A1170 was specified using this latter value.

TABLE 3

Details of the polymers STP produced.
Noninventive entries are marked "Ref.".

| Polymer STP | Isocyanate | Polyol | NCO:OH* | % by wt. NCO |
|---|---|---|---|---|
| STP01 (Ref.) | IPDI | Desmophen C1200 | 1.9 | 3.0 |
| STP02 | IPDI | Kuraray C590 | 1.9 | 8.2 |
| STP03 (Ref.) | IPDI | Oxymer M112 | 1.9 | 5.2 |
| STP04 | IPDI | Desmophen C1100 | 1.9 | 5.3 |
| STP05 (Ref.) | IPDI | Dynacoll 7131 | 1.98 | 2.05 |
| STP06 (Ref.) | IPDI | Baycoll AS 2060 | 2.21 | 4.2 |
| STP07 (Ref.) | IPDI | Baycoll AS 2060 | 2 | 3.5 |
| STP08 | IPDI | Capa 3031 | 2 | 12.9 |
| STP09 | IPDI | Capa 4101 | 2.5 | 11.66 |
| STP10 | IPDI | Capa 4101 | 2.02 | 8.8 |
| STP11 | IPDI | Baycoll 670 | 2 | 5.55 |
| STP12 (Ref.) | IPDI | Baycoll AV 2113 | 2 | 6.66 |

*calculated values.

Formulation of the Adhesion Promoter Compositions

A binder composition was initially produced from each of the produced polymers STP01 to STP13 by diluting the polymer with MEK to afford a 20% solution (20% by weight of polymer). Further additives such as organosilane OS2 were then added depending on the experiment. Each resulting composition was diluted with MEK such as to afford a solution having a solids content of 20% by weight. The solids content here describes the sum of all nonvolatile substances. Details of the thus produced adhesion promoter compositions are reported in table 4. All reported numerical amounts for the additives are in % by weight based on the total composition.

TABLE 4

Adhesion promoter compositions produced.
The compositions designated
"Inv" are inventive while those designated "Ref" are noninventive.

| Example | Polymer STP | Silquest A1170 | Silquest A189 | Silquest A-Link 597 | Tyzor IBAY | Al(2-OBu)$_3$ |
|---|---|---|---|---|---|---|
| Ref-01 | STP01 | — | — | — | 2 | — |
| Ref-02 | STP02 | — | — | — | — | — |
| Inv-01 | STP02 | — | — | — | 2 | — |
| Inv-02 | STP02 | 4 | — | — | 4 | — |
| Inv-03 | STP02 | 2 | — | — | 2 | 2 |
| Ref-03 | STP02 | — | — | — | — | 2 |
| Ref-04 | STP03 | — | — | — | 2 | — |
| Ref-05 | STP03 | — | 2 | — | 2 | — |
| Ref-06 | STP04 | — | — | — | — | — |
| Inv-04 | STP04 | — | 2 | 2 | 2 | — |
| Ref-07 | STP05 | — | — | — | 2 | — |
| Ref-08 | STP05 | 2 | — | — | 2 | — |
| Ref-09 | STP06 | — | — | — | 2 | — |
| Ref-10 | STP07 | 4 | — | — | — | — |
| Ref-11 | STP07 | 4 | — | — | 4 | — |
| Ref-12 | STP08 | — | — | — | — | — |
| Inv-05 | STP08 | 2 | — | — | 2 | — |
| Ref-13 | STP09 | — | — | — | — | — |
| Inv-06 | STP09 | — | 2 | — | 2 | — |
| Inv-07 | STP10 | 4 | — | — | 4 | — |

TABLE 4-continued

Adhesion promoter compositions produced.
The compositions designated
"Inv" are inventive while those designated "Ref" are noninventive.

| Example | Polymer STP | Additives | | | | |
|---|---|---|---|---|---|---|
| | | Silquest A1170 | Silquest A189 | Silquest A-Link 597 | Tyzor IBAY | Al(2-OBu)$_3$ |
| Ref-14 | STP11 | — | — | — | — | — |
| Inv-08 | STP11 | — | — | — | 2 | — |
| Inv-09 | STP11 | 2 | — | — | — | — |
| Inv-10 | STP11 | 2 | — | — | 2 | — |
| Ref-15 | STP12 | 4 | — | — | — | — |
| Ref-16 | STP12 | 2 | — | — | 2 | — |

The adhesion promoter compositions in table 4 were placed into tightly sealable glass bottles and after one day of storage at room temperature used for the adhesion tests. The substrate used was float glass (Rocholl, Germany) and both the air side and the tin side were used for adhesive bonding.

Open Time Test

The open time was tested on a selected inventive adhesion promoter composition. For accelerated testing the substrates with applied adhesion promoter were stored under cataplasma conditions (70° C., 100% relative atmospheric humidity) and subsequently adhesively bonded according to the method described above. The results are reported table 56.

TABLE 5

Adhesive bonding on float glass (air side)
immediately and after cataplasma storage.

| Example | Immediately | 7 d CL | 14 d CL |
|---|---|---|---|
| Inv-04 | 100 | 100 | 100 |

Adhesion Test of Adhesion Promoter Compositions

The compositions were then applied to an air side and a tin side of a float glass substrate using a cellulose cloth (Tela®, Tela-Kimberly Switzerland GmbH) impregnated therewith. All substrates were cleaned immediately prior to application of the adhesion promoter composition by wiping using a cellulose cloth (Tela®) that had been soaked with an isopropanol/water mixture (2:1) and flashed off for at least 2 minutes prior to the application of the adhesion promoter composition.

5 seconds after application of the adhesion promoter composition the substrate was wiped with a dry cellulose cloth ("wipe off"). Within 10 minutes a round bead of a SikaFlex® 250 adhesive was subsequently applied using an extrusion cartridge and a nozzle. SikaFlex® 250 is a high-modulus, one-component, moisture-curable polyurethane adhesive which contains polyurethane prepolymers having isocyanate groups but no adhesion promoters and is commercially available from Sika Schweiz AG.

The adhesive was tested after a curing time of 7 days in a conditioning chamber ('KL') (23° C., 50% rel. atmospheric humidity) and after subsequent water storage ('WL') in water at 23° C. over 7 days and after subsequent cataplasma storage ('CL') of 7 days at 70° C. and 100% relative atmospheric humidity and (in selected examples) after a subsequent heat storage ('HL') of 24 hours at 120° C. in an oven.

The adhesion of the adhesive was tested using the 'bead adhesion test'. This involves cutting into the bead at its end just above the adhesive bonding surface. The cut end of the bead is held with round-nose pliers and pulled away from the substrate. This is done by carefully rolling up the bead onto the tip of the pliers, and making a cut at right angles to the bead pulling direction down to the bare substrate. The bead pulling speed should be chosen such that a cut has to be made about every 3 seconds. The test distance must correspond to at least 8 cm. What is assessed is the adhesive remaining on the substrate after the bead has been pulled away (cohesion failure). The adhesion properties are assessed by visual determination of the cohesive proportion of the bonding area.

The higher the proportion of cohesive failure the better the adhesive bonding. Test results with cohesion failures of less than 50%, in particular less than 30%, are typically considered inadequate.

The results are shown in table 6.

The results from table 6 show clearly that the adhesion promoters according to the invention achieve markedly better adhesion results on float glass under all tested conditions.

TABLE 6

Test results of adhesive bonding on float glass (air side and tin side).
The compositions designated "Inv" are inventive while those designated "Ref" are noninventive. "n/b" means that the measurement was not carried out. All inventive compositions produced showed exceptional storage stability.
Even after several months no precipitation or cloudiness was observable.

| | Air side | | | | Tin side | | | |
|---|---|---|---|---|---|---|---|---|
| Example | KL | WL | CL | HL | KL | WL | CL | HL |
| Ref-01 | 100 | 100 | 25 | n/b | 5 | 5 | 0 | n/b |
| Ref-02 | 0 | 25 | 50 | n/b | 0 | 0 | 50 | n/b |
| Inv-01 | 100 | 100 | 100 | 100 | 100 | 50 | 100 | n/b |
| Inv-02 | 100 | 100 | 100 | 100 | 100 | 75 | 100 | n/b |
| Inv-03 | 100 | 100 | 100 | 100 | 100 | 100 | 100 | n/b |
| Ref-03 | 100 | 100 | 100 | 100 | 0 | 75 | 100 | n/b |
| Ref-04 | 0 | 0 | 0 | n/b | 0 | 0 | 0 | n/b |
| Ref-05 | 0 | 0 | 0 | n/b | 0 | 0 | 0 | n/b |
| Ref-06 | 100 | 100 | 0 | n/b | 0 | 0 | 0 | n/b |
| Inv-04 | 100 | 100 | 95 | n/b | 50 | 50 | 100 | n/b |
| Ref-07 | 100 | 100 | 0 | n/b | 100 | 0 | 100 | n/b |
| Ref-08 | 100 | 100 | 0 | n/b | 100 | 0 | 100 | n/b |
| Ref-09 | 100 | 100 | 0 | n/b | 0 | 0 | 100 | n/b |
| Ref-10 | 0 | 0 | 0 | n/b | 0 | 20 | 10 | n/b |
| Ref-11 | 100 | 0 | 0 | n/b | 100 | 100 | 100 | n/b |
| Ref-12 | 100 | 100 | 100 | n/b | 100 | 0 | 0 | n/b |
| Inv-05 | 100 | 100 | 100 | n/b | 100 | 50 | 100 | n/b |
| Ref-13 | 100 | 100 | 100 | n/b | 20 | 0 | 20 | n/b |
| Inv-06 | 100 | 95 | 75 | n/b | 95 | 50 | 75 | n/b |
| Inv-07 | 100 | 100 | 100 | n/b | 100 | 50 | 100 | n/b |
| Ref-14 | 100 | 100 | 100 | 25 | 25 | 0 | 100 | 50 |
| Inv-08 | 100 | 100 | 100 | 100 | 100 | 50 | 100 | 100 |
| Inv-09 | 100 | 100 | 100 | 50 | 100 | 90 | 100 | 50 |
| Inv-10 | 100 | 100 | 100 | 100 | 100 | 100 | 100 | 100 |
| Ref-15 | 100 | 100 | 100 | n/b | 0 | 0 | 95 | n/b |
| Ref-16 | 100 | 100 | 70 | n/b | 100 | 0 | 100 | n/b |

The invention claimed is:
1. An adhesion promoter composition containing
 a) between 40 and 80 parts by weight of a binder composition comprising
  i) 20% to 40% by weight based on the binder composition of at least one silane-terminated polyurethane polymer STP obtainable from at least one polyol P, at least one aliphatic polyisocyanate I and at least one organosilane OS1 in the presence of a catalyst K,
  ii) 4% to 20% by weight based on the binder composition of at least one organosilane OS2 and/or organotitanate OT, iii) 0% to 3% by weight based on the binder composition of at least one drying agent,
iv) 40% to 80% by weight based on the binder composition of a solvent L1;
b) between 0 and 30 parts by weight of carbon black;
c) between 0 and 1 parts by weight of UV marker;
d) sufficient of a solvent L2 for a) to d) to sum to 100 parts by weight;

wherein
the organosilane OS1 comprises a secondary amino group, a mercapto group or a hydroxyl group on the organic radical,
the at least one silane-terminated polyurethane polymer STP was produced in the absence of the organosilane OS2,
the at least one polyol P is selected from the group of polycarbonate polyols, polyester polyols or poly(meth)acrylate polyols, and
the at least one polyol P has an average OH functionality of at least 2 and an equivalent weight of not more than 500.

2. The adhesion promoter composition as claimed in claim 1, wherein the organosilane OS2 and/or organotitanate OT comprises at least one, compounds selected from the group comprising aminosilanes, hydroxysilanes, epoxysilanes, mercaptosilanes, isocyanuratosilanes, reaction products of amines and epoxysilanes, reaction products of aminosilanes and epoxides, reaction products of aminosilanes and epoxysilanes, reaction products of isocyanates and aminosilanes, reaction products of isocyanates and hydroxysilanes, tetraalkoxytitanates, dialkoxybisacetylacetonatotitanates and mixtures, hydrolyzates, partial hydrolyzates and/or condenzates of these compounds.

3. The adhesion promoter composition as claimed in claim 1, wherein the polyisocyanate I comprises isophorone diisocyanate.

4. The adhesion promoter composition as claimed in claim 1, wherein the molar ratio of isocyanate groups of the polyisocyanate I to hydroxyl groups of the polyol P is between 2 and 4.

5. The adhesion promoter composition as claimed in claim 1, wherein the polyol P has an average OH functionality of between 2 and 5.

6. The adhesion promoter composition as claimed in claim 1, wherein the at least one polyol P has an equivalent weight of 100 to 500.

7. The adhesion promoter composition as claimed in claim 1, wherein the solvents L1 and L2 are selected from the group comprising methyl acetate, ethyl acetate, butyl acetate, isopropyl acetate, 1-methoxy-2-propyl acetate, 3-methoxy-n-butyl acetate, acetone, methyl ethyl ketone, methyl isobutyl ketone, toluene, ethylbenzene and mixtures thereof.

8. The adhesion promoter composition as claimed in claim 1, wherein the catalyst K comprises a tin or zirconium complex.

9. The adhesion promoter composition as claimed in claim 1, containing
a) between 50 and 70 parts by weight of the binder composition comprising
i) 25% to 35% by weight based on the binder composition of the at least one silane-terminated polyurethane polymer STP obtainable from the at least one polyol P, the at least one aliphatic polyisocyanate I and the at least one organosilane OS1 in the presence of the catalyst K,
ii) 4% to 16% by weight based on the binder composition of the at least one organosilane OS2 and/or organotitanate OT,
iii) 0.5% to 1.5% by weight based on the binder composition of the at least one drying agent,
iv) 50% to 70% by weight based on the binder composition of the solvent L1;
b) between 5 and 15 parts by weight of carbon black;
c) between 0.1 and 0.5 parts by weight of UV marker;
d) sufficient of the solvent L2 for a) to d) to sum to 100 parts by weight.

10. A method of adhesive bonding or of sealing comprising the steps of
i) applying an adhesion promoter composition according to claim 1 to a substrate S1 to be adhesively bonded or sealed
ii) applying an adhesive or sealant to the composition present on the substrate S1
iii) contacting the adhesive or sealant with a second substrate S2;
or
i') applying an adhesion promoter composition according to claim 1 to a substrate S1 to be adhesively bonded or sealed
ii') applying an adhesive or sealant to the surface of a second substrate S2
iii') contacting the adhesive or sealant with the composition present on the substrate S1;
or
i') applying an adhesion promoter composition according to claim 1 to a substrate S1 to be adhesively bonded or sealed
ii") applying an adhesive or sealant between the surfaces of substrates S1 and S2,
wherein the second substrate S2 is made of a material which is identical or different to that of the substrate S1.

11. The method as claimed in claim 10, wherein at least one of the substrates S1 and S2 comprises glass, metal or ceramic.

12. The method as claimed in claim 10, wherein the adhesive or sealant is a polyurethane adhesive containing at least one isocyanate-comprising polyurethane prepolymer or is an adhesive based on silane-functional polymers.

13. An article produced by a method as claimed in claim 10.

14. The article as claimed in claim 13, wherein the article is a built structure, an industrial good or a mode of transport.

* * * * *